W. DICKS.
NUT-LOCK.
No. 186,926.    Patented Feb. 6, 1877.
Fig 1.
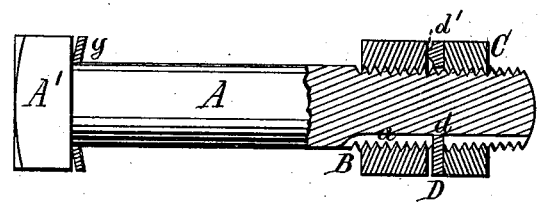
Fig 8.
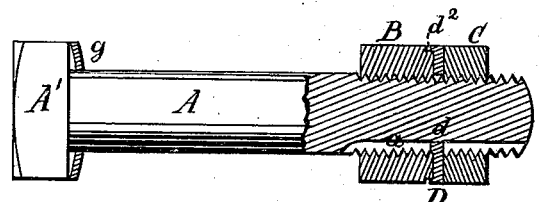
Fig 2.
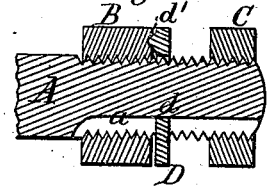
Fig 4.
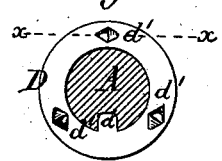
Fig 5.
Fig 3.
Fig 9.
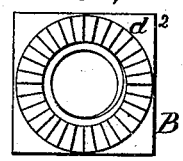
Fig 6.
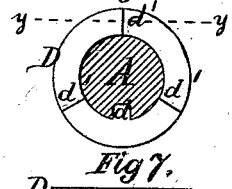
Fig 10.
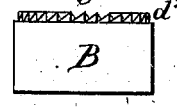
Fig 7.
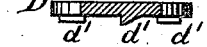
Fig 11.
Witnesses:
J. P. Theodore Lang.
James Martin Jr.
Inventor:
William Dicks,
by
Mason, Fenwick & Lawrence
attys.
N. PETERS, PHOTO-LITHOGRAPHER, WASHINGTON, D. C

UNITED STATES PATENT OFFICE.

WILLIAM DICKS, OF CLIFTON, ONTARIO, CANADA.

IMPROVEMENT IN NUT-LOCKS.

Specification forming part of Letters Patent No. 186,926, dated February 6, 1877; application filed November 25, 1876.

*To all whom it may concern:*

Be it known that I, WILLIAM DICKS, of Clifton, in the county of Welland, in the Province of Ontario and Dominion of Canada, have invented a new and useful Improvement in Nut-Locks, which improvement is fully set forth in the following specification, reference being had to the accompanying drawings, in which—

Figure 1 is a longitudinal view of a bolt, nuts, and locking-washer in accordance with my invention. Fig. 2 is a similar view, showing the jam-nut loosened and the locking-washer in its active position. Fig. 3 is a similar view, the nuts being unlocked and separated. Fig. 4 is a cross-section of the bolt with the locking-washer attached and in elevation. Fig. 5 is a cross-section of the washer in the line $x$ $x$ of Fig. 4. Fig. 6 is a cross-section of the bolt with a locking-washer in elevation, said washer having its teeth of a modified construction. Fig. 7 is a cross-section of the same in the line $y$ $y$ of Fig. 6. Fig. 8 is a bolt with the modified locking device shown in Figs. 9, 10, and 11 applied to it. Fig. 9 is a face view of the main nut of the said modified device. Fig. 10 is an edge view of the same, and Fig. 11 is a section of the same.

The nature of my invention consists in certain constructions, combinations, and arrangements of parts, as hereinafter described and specifically claimed, whereby an improved nut-locking contrivance is produced, which, while it firmly locks the nut from turning on the bolt, does not involve the destruction of the locking washer or nut, in order to turn back the nuts with the wrench.

In the drawings, Fig. 1, A represents a screw-bolt, the threaded part of which is provided with a longitudinal groove, $a$. The said bolt A is provided with a nut, B, and a jam-nut, C, of ordinary construction. Between the nuts B and C a locking-washer, D, is interposed, which is provided with a keying-tongue, $d$, on its interior edge, and thereby is prevented from turning, as the said tongue fits the groove $a$ of the bolt. One of the faces of the washer D is provided with projections $d^1$, either in the shape of a rasp-cut tooth, as shown in Figs. 4 and 5, or a ratchet-tooth, as shown in Figs. 6 and 7, but in both cases pointing in the direction of the thread on the bolt. The other face of the washer is plain. The nut B, if used as in Fig. 1, is plain on its faces; but may be toothed on its outer face, as shown at $d^2$ in Fig. 9, if used as shown in Fig. 8.

If a washer, D, with teeth formed as shown in Figs. 4 and 5, is used, it will be made of tempered steel, as its teeth are required to penetrate the nut B, as in Fig. 2; but if a washer with teeth shaped as shown in Fig. 7 is used, it will be made of cast malleable iron, or cast cast-steel, or other suitable metal, as its teeth are only required to engage with the teeth $d^2$, already formed on the outer face of the main nut B, as shown in Figs. 8, 9, and 10. In some cases the teeth, if used on both the nut and washer, might be in form of ordinary cog-teeth; or, instead of using teeth on the face of the tongued washer, this tongued washer might be in form of a rectangular box, and fitted around the sides of the nut, and up against its outer face.

Operation: The nut B, Fig. 1, is screwed in its place. The washer D is put on the bolt, with its projections $d^1$ toward the nut B, and, finally, the jam-nut C is screwed on the bolt until it forces the points or edges of the projections $d^1$ of the washer D into the face of the nut B. Nut B, being now locked, cannot revolve on the bolt, as the keying-tongue $d$ is in the groove $a$, the projections $d^1$ in the metal of the nut B, and the nut C bears against the washer D in such a manner as to prevent longitudinal movement thereof.

With the construction shown in Fig. 8, the operation is just the same, except that the projections $d^1$ engage with teeth $d^2$, instead of penetrating the nut.

With the nut-locking contrivance described it is not necessary that an object be interposed between the head of the bolt and the nut B, for the nut B can be placed on the bolt at any point desired, and locked firmly in place without depending upon any inner bearing. Further, the shank of the bolt used may be round under the head, and in cases where the turning of the nut with the wrench is prevented by contact with any object, the bolt itself can be turned by its head; and if contraction and expansion are to be provided for, a spring-washer, $g$, may be placed under the head of the bolt.

Having described my invention, what I claim, and desire to secure by Letters Patent, is—

A locking-washer having holding projections $d^1$ on its face, and a tongue, $d$, in combination with a grooved screw-bolt, A, and nuts B and C, substantially as set forth.

Witness my hand in the matter of my application for a patent for an improved nut-lock this 21st day of November, 1876.

WILLIAM DICKS.

Witnesses:
 JAMES MARTIN, Jr.,
 A. G. HEYLMAN.